United States Patent [19]

Kiendl

[11] 4,359,186
[45] Nov. 16, 1982

[54] MIXING VALVE ARRANGEMENT

[75] Inventor: Harro Kiendl, Witten-Bommern, Fed. Rep. of Germany

[73] Assignee: Friedrich Grohe Armaturenfabrik GmbH & Co., Hemer, Fed. Rep. of Germany

[21] Appl. No.: 287,639

[22] Filed: Jul. 28, 1981

[30] Foreign Application Priority Data

Aug. 14, 1980 [DE] Fed. Rep. of Germany ....... 3030716

[51] Int. Cl.³ ...................... G05D 11/00; G05D 23/00
[52] U.S. Cl. ...................................... 236/12 A; 137/88
[58] Field of Search ............... 236/12 AB, 12 AA, 13, 236/78 A; 137/88, 3

[56] References Cited

U.S. PATENT DOCUMENTS 3,437,461  4/1969  Hoffman et al. ................. 137/88 X
3,721,253  3/1973  Remke ............................. 137/88 X
3,721,386  3/1973  Brick et al. ..................... 236/12 AB Primary Examiner—William E. Wayner
Attorney, Agent, or Firm—James B. Raden; Donald J. Lenkszus

[57] ABSTRACT

A mixing valve arrangement for producing temperature controlled water wherein an electromagnetically actuatable supply valve is coupled in each of the hot and cold water supply lines is described. Electronic control loop circuits generate a temperature control signal from both a temperature preselector and a temperature detector and a volume control signal from both a volume preselector and a mixed water flow volume detector. An electronic decoupling circuit is interposed between the two control loop circuits and the valve actuating circuits to derive control signals representative of the degree of opening of the two supply valves from the temperature and volume control signals.

4 Claims, 3 Drawing Figures

MIXING VALVE ARRANGEMENT

BACKGROUND OF THE INVENTION

This invention pertains to a mixing valve arrangement of the type using an electromagnetically actuated supply valve in hot and cold water lines.

Valve arrangements of this type are known, for example, from CH-PS No. 451 626 and DE-OS No. 23 23 841. In these mixing valves only the temperature of the mixed water produced is adjusted or varied electronically, and not, at the same time, the discharge volume of the mixed water. A separate manually operated volume control valve is necessary for control of the discharge volume.

It is an object of the invention to provide an improved mixing valve arrangement wherein the mixed water temperature can be electronically adjusted and regulated and, in addition, the volume discharged can be electronically adjusted and regulated.

SUMMARY OF THE INVENTION

A valve arrangement in accordance with the principles of the invention permits the discharge volume to be adjusted by for example a potentiometer or push button which may be remotely located.

A valve arrangement in accordance with the invention includes a first electromagnetically actuatable valve in a hot water supply line, a second electromagnetically actuatable valve in a cold water supply line, first and second actuators for actuating the hot and cold water valves in response to first and second control signals, respectively. A temperature detector measures the temperature of mixed water. A temperature preselector selects a desired temperature. A temperature control loop circuit is coupled to the temperature detector and to the temperature preselector and provides an output signal, r, for temperature control. A flow volume detector detects the flow volume of mixed water. A volume preselector selects a desired flow volume of mixed water. A volume control loop circuit is coupled to the volume detector and volume preselector and provides an output signal, q, for volume control. An electronic decoupling circuit operates on the signals q and r to generate the first and second control signals, i.e., it generates signals representative of the amount of opening of the first and second valves as a function of the amount of temperature and volume correction indicated by r and q respectively.

The steady state characteristics by which the two input values q and r are used to provide the resultant values for the mixed water temperature $T_M$ and the mixed volume $Q_M$ advantageously achieve highly effective temperature regulation. Any variation of the discharge volume has no effect on the mixed water temperature. On the other hand with the priorly known mixing valves a reduction of the discharge volume by operation of the volume control valve generally has the effect of not slackening the component streams in the same ratio when asymmetrical pressures exist on the cold water side $P_K$ and the hot water side $P_W$, causing the mixed water temperature to be charged and only later to be rectified again by the intervention of the control. The present arrangement permits greater temperature control effectiveness to be achieved.

In addition, the arrangement in accordance with the invention does not place any special requirements on the linearity of the mechanical valves since the characteristics can be compensated for electronically by characterizing elements. Therefore inexpensive standard mechanical valves can be used. In special cases, e.g. where it is well known that grossly asymmetrical pressure conditions exist, a non-linear valve characteristic is more favorable for the achievement of greater control effectiveness than a linear characteristic. By using characterizing elements it is possible optimally to use unmodified mechanical valves even in such situations.

The arrangement in accordance with the invention can easily be used in conjunction with a time switch so that, for example a bath can be filled in accordance with a time program. The arrangement can also be used to advantage directly connected to a level gauge so that, for example the filling of a bath is stopped when a predetermined level is reached.

BRIEF DESCRIPTION OF THE DRAWINGS

The invention may be better understood from a reading of the following detailed description in conjunction with the drawings in which.

DETAILED DESCRIPTION

Figure 2:
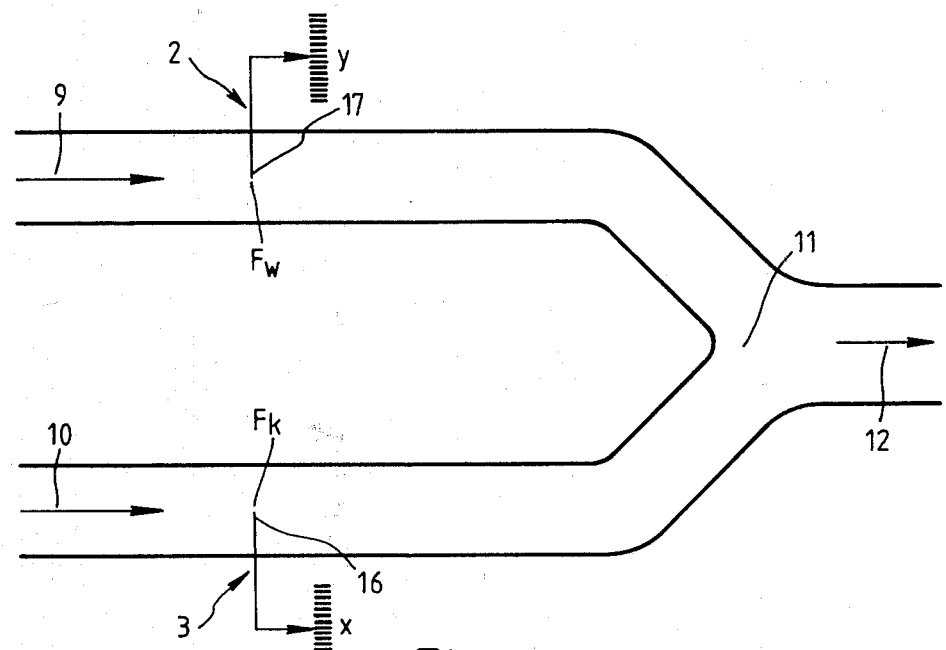
FIG. 2 is a diagrammatic arrangement of the flow paths and their associated supply valves of the arrangement shown in FIG. 1.

The valve arrangement 1 shown on the drawing includes supply valves 2, 3 located in a hot water supply main 9 and a cold water supply main 10, respectively. A mixing chamber 11 is situated downstream of valves 2, 3 for producing the mixed water. A mixed water outlet 12 is downstream of the mixing chamber 11. Near the mixing chamber 11 on its downstream side, are an electronic temperature detector 8 and a fluid volume measuring element 4 for the mixed water volume discharge which, together with a temperature preselector 6 and a volume preselector 7, generate the control values for the supply valves 2, 3 by means of an electronic control units 53, 54 via a decoupling element 5. The supply valves 2, 3, each have a control element 21, 31 for infinitely variable control or fine adjustment of each closure element 16, 17 of the supply valves 2, 3. The control elements 21, 31 are each controlled by input signals $x_{soll}$ and $y_{soll}$, respectively. Signal $x_{soll}$ corresponds to the desired position x of the closure element 16 of valve 3. Signal $y_{soll}$ corresponds to the desired position y of the closure element 17 of valve 2 (see FIG. 2). The control elements 21, 31 are designed so that the value of x or y at any instant is rapidly adjusted to the desired value without overshooting.

A control element 21, 31 may each be a conventional basic positioning control loop utilizing a d.c. motor. The values x and y can be measured for example with a potentiometer or inductively by a non-contact method. Alternatively each control element may operate without a measuring element for position determination by using a conventional stepping motor. In this case, the signals x and y are derived from the number of forward and reverse impulses which control the stepping motor. Directly driven electrical proportional valves can also be used.

Figure 1:
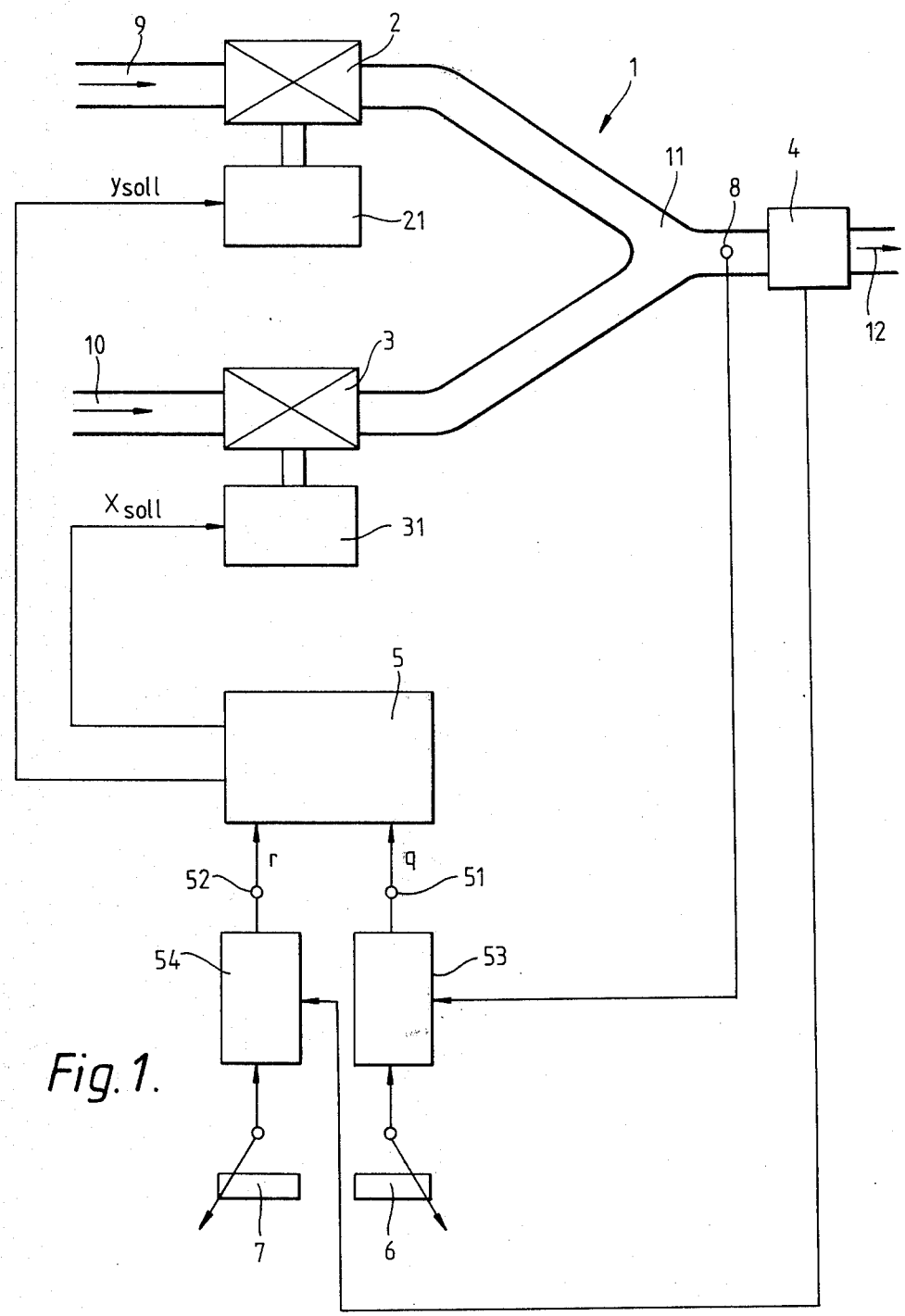
FIG. 1 is a diagrammatic arrangement of a valve arrangement.
Figure 3:
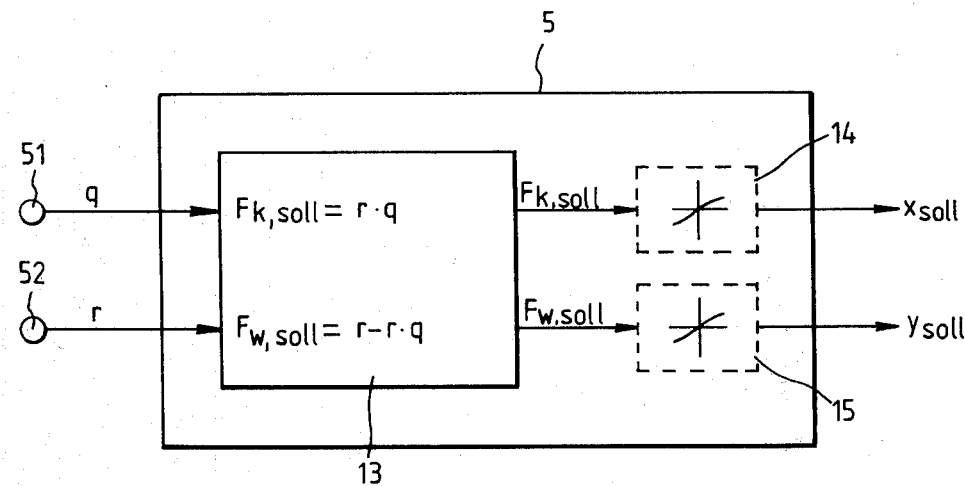
FIG. 3 is a block diagram of the decoupling element with switching module and characteristic elements of the arrangement shown in FIG. 1.

The electronic decoupling element 5 provided with two control inputs 51, 52 can be arranged as shown in FIG. 3. It includes a switching module 13 which converts the two input values q and r ($0 \leq q \leq 1, 0 \leq r \leq 1$) to the values $F_{K,soll}$ and $F_{W,soll}$ ($0 \leq F_{K,soll} \leq 1$ and $0 \leq F_{W,soll} \leq 1$) which represent the desired values for the port openings, $F_K$ and $F_W$ in the supply valves 2, 3. The values $F_{K,soll}$ and $F_{W,soll}$ are transmitted by non-linear characteristic elements 14,15 whose output values are $x_{soll}$ and $y_{soll}$ with $0 \leq x_{soll} \leq 1$ and $0 \leq y_{soll} \leq 1$. The characteristic elements 14,15 are provided to compensate for any great non-linearity existing in the valve characteristic $F_K = f(x)$ and $F_W = f(y)$. In the event of a sufficiently good linear relationship $F_K = cx$ and $F_W = cy$, the characteristic elements may be omitted. If this decoupling element 5 is connected to the control elements 21, 31 as shown in FIG. 1, the control value q acts mainly on the mixed water temperature $T_M$. (When the supply pressure $P_x$ and $P_y$ are symmetrical, q has no influence on the volume of mixed water discharged $Q_M$ and when the pressures are asymmetrical, q has a certain influence on it). The control value r always influences the volume of mixed water discharged $Q_M$ only, but has no influence on the mixed water temperature $T_M$. (This applies when the discharge resistance can be neglected.) The electronic arrangement of a switching module 13 is easily provided with the aid of conventional operational amplifiers and an electronic multiplier. The characteristic elements 14,15 can be provided by diode elements.

A conventional PI or PID control can be used for the temperature control loop. In this event, the control signal coming from the temperature preselector 6 is transmitted by an electronic time delay element whose time constant corresponds to the time constant of the electronic temperature detector 8 before entering the actual control loop, i.e. before being compared with the actual value of the mixed water temperature. With this arrangement initial overshooting of the mixed water temperature is avoided when the user selects changes in the desired temperature values.

Measuring element 4 is provided for determining the discharge volume and may directly measure the volume $Q_M$ of the mixed water flowing. One example of this type of measuring element is a rotameter which is based on the use of a suspended body. The position of the suspended body which represents a measure of the discharge volume can be measured inductively.

Another possible arrangement of the measuring element 4 for determining the discharge volume $Q_M$ of the mixed water consists of the two supply volumes $Q_K$ and $Q_W$ being measured in the supply mains, each using a direct measuring element, e.g. a rotameter, the resultant values being added. Compared with the previously mentioned arrangement, this possibility requires a second flow meter; it has however the following advantage: the pressures $P_K - P_M$ and $P_W - P_M$ and their ratios $(P_K - P_M):(P_W - P_M)$ can be determined from the known volumes $Q_K$ and $Q_W$ and the known port openings $F_K$ and $F_W$, the pressure in the mixing chamber 11 being designated by $P_M$. This ratio has a considerable influence on the relationship between the input value q of the decoupling element 5 and the resultant mixed water temperature $T_M$. The ratio $(P_K - P_M):(P_W - P_M)$ derived from an electronic circuit or computer can therefore be used to improve the method of temperature control by the well known procedure of "disturbance feed forward".

A third possible arrangement of the measuring element 4 is of a more indirect nature. It is based on a measurement of the supply pressures $P_K$ and $P_W$ and also possibly of the pressure of the mixed water $P_M$. For this purpose, the well known method of measuring pressure based on strain gauges can be used. Using an electronic circuit or computer, the important value $Q_M$ can then be derived from the values $P_K$, $P_W$, $P_M$ and the values $F_K$ and $F_W$. With this method again, the ratio $(P_K - P_M):(P_W - M_M)$ can be derived by means of an electronic circuit or computer and used to improve the temperature control by the disturbance variable feed forward method.

It should be noted that the effectiveness of the temperature control in each case can be still further improved by measuring the supply temperatures $T_K$ and $T_W$ electronically in addition and using them for a disturbance variable feed forward.

What is claimed is:

1. A valve arrangement for the production of temperature controlled water at an outlet by mixing hot and cold water from hot and cold water supply lines, said arrangement comprising:

a first electromagnetically actuatable supply valve coupled between said hot water supply line and said outlet;

a second electromagnetically actuatable supply valve coupled between said cold water supply line and said outlet;

said first and second supply valves being independently actuatable;

first control means for actuating said first supply valve in response to a first control signal;

second control means for actuating said second supply valve in response to a second control signal;

temperature detecting means for measuring the temperature of mixed water of said outlet;

volume detecting means for measuring the flow volume of mixed water at said outlet;

temperature preselecting means for preselecting a desired temperature of said mixed water;

volume preselecting means for preselecting a desired flow volume of said mixed water;

first control loop means having inputs coupled to said temperature detecting means and said temperature preselecting means for generating a temperature control signal in response to said detected temperature and said preselected temperature;

second control loop means having inputs coupled to said volume preselecting means and said volume detecting means for generating a volume control signal in response to said preselected value and said measured flow volume; and decoupling means for generating said first and second control signals in response to said temperature control signal and said volume control signal.

2. A valve arrangement in accordance with claim 1, wherein said first control signal represents the degree of opening of said first valve;

said second control signal represents the degree of opening of said second valve; and said decoupling means comprises switching means for converting said temperature and volume control signals to said first and second control signals.

3. A valve arrangement in accordance with claim 2, wherein said decoupling means comprises means coupled to said switching means for compensating for certain characteristics of said first and second valve means.

4. A valve arrangement in accordance with claim 3, wherein said first loop control means comprises time delay means coupled to said first preselector and having a time constant corresponding to a time constant of said temperature detecting means.

* * * * *